Patented Jan. 8, 1952

2,581,413

UNITED STATES PATENT OFFICE 2,581,413

PRODUCTION OF DRYING OILS

John C. Hillyer, Bartlesville, Okla., and James T. Edmonds, Sunflower, Kans., assignors to Phillips Petroleum Company, a corporation of Delaware No Drawing. Application October 8, 1947, Serial No. 778,720

9 Claims. (Cl. 260—407)

This invention relates to the production of drying oils. In one embodiment it relates to a process for the producing of drying oils by condensation of an open chain conjugated olefinic material with an unsaturated glyceride. In one specific embodiment this invention relates to the production of a drying oil by condensation of butadiene with linseed oil.

The use of unsaturated glyceride oils, typified by tung or China-wood oil, in the manufacture of paints, varnishes, floor coverings, and the like has long been known and practiced in the art. These oils, known as drying oils possess the ability when exposed on a surface to air, to form tough and durable films. Linseed oil, the most widely used of the drying oils, dries slowly unless it is subjected to a special treatment, such as boiling, air blowing, use of chemical additives known as driers, and the like. Soy bean oil, corn oil, cottonseed oil and other semi-drying oils which are abundantly available from domestic sources are extremely slow in drying and as a result have found only limited use in the production of protective coating materials.

In the past, certain processes have been developed for the condensation of unsaturated glyceride oils of the drying or semi-drying type with cyclic diolefins, such as cyclopentadiene, for the purpose of improving their drying characteristics. However, cyclopentadiene is usually not readily available other than in a polymeric form, such as the dimer, trimer, tetramer, and higher polymers, from which it is obtained by expensive cracking operations or other laborious processes.

We have now discovered a process wherein unsaturated glyceride oils are converted to products possessing superior drying properties by condensation of unsaturated glyceride oils with open chain conjugated diolefins and triolefins. By the method of our invention the unsaturated glyceride oils, such as linseed oil, soy bean oil or the like, are contacted with an excess amount of an open chain conjugated olefinic material, such as a diolefin or triolefin, at temperatures below that at which appreciable dimerization of the conjugated olefinic material occurs until condensation has been effected. The excess conjugated olefinic material is then vented from the reactor for subsequent use; after which, the temperature is elevated to higher levels for a suitable period of time to stabilize and body the resulting condensation product.

When operating in this manner, the product obtained has drying properties much superior to the original glyceride oil. For example, linseed oil condensed with butadiene by our process has drying properties similar to those of tung oil. Semi-drying oils, such as soy bean oil, ordinarily considered to have but limited utility in the production of coating compounds, yield products comparable with linseed oil in drying properties. In general, the improvements obtained by our process are substantially greater than those observed when using cyclopentadiene according to methods of the prior art.

It is a further advantage of our process that a substantial excess of conjugated diolefin or triolefin can be used in the condensation step, thus effecting a high degree of combination of the conjugated olefinic material with the glyceride oil. Conditions maintained in this step are such that losses of the olefinic material from dimerization are reduced to a minimum. After the condensation has been effected and the excess aliphatic conjugated olefinic material is removed the condensate is rendered more stable as the temperature is elevated into the range of about 350 to 500° F. and at a temperature between about 550 and about 600° F. the product is bodied to the desired degree of viscosity.

An object of this invention is to provide a new type of drying oil.

Another object is to provide a process for producing drying oils.

Still another object is to produce a drying oil by condensing an open chain conjugated olefinic material, such as a conjugated diolefin or a conjugated triolefin, with an unsaturated glyceride oil.

Another object is to produce a drying oil by condensing soy bean oil with butadiene.

Still another object is to produce a drying oil by condensating butadiene with linseed oil.

Other objects and advantages of our invention will be obvious to one skilled in the art from the accompanying disclosure and discussion.

In one embodiment of our invention an unsaturated glyceride oil is admixed in a reactor with an open chain conjugated diolefin or triolefin in a ratio of from about 0.5 to about 4.0 parts by weight of oil to one part by weight of the diolefin or triolefin. The reactor is then sealed and the temperature elevated to from about 200 to 350° F. for a period of from about two to about twenty hours, preferably from about five to about fifteen hours. The pressure in the reactor will depend upon several factors, such as the particular temperature employed, olefinic material used and the ratio of olefinic material to glyceride oil used. The pressure employed is not critical, but usually a pressure sufficient to maintain a liquid phase in the reaction zone is preferred. At the end of this period the unreacted olefinic material is vented into a suitable condenser from which it is returned to storage for other use or for recycling. The small amounts of dimer, which may have been formed during the reaction period, may conveniently be removed at this stage in the process by distillation directly from the reaction chamber. If desired, the dimer may be removed after the stabilizing period immediately prior to bodying the oil. The reactor is then resealed and the temperature elevated slowly to the range between about 350° and about 600° F., while at temperatures between about 350° and about 500° F. changes are effected in the condensation product whereby the olefinic material becomes more firmly bound in the glyceride oil. Bodying of the condensation product to the desired viscosity is preferably effected in the range between about 550° and about 600° F. The time required for the elevated temperature treatment of the condensate will usually be from about one to ten hours, but preferably from two to six hours.

The present process can be applied to the treatment of unsaturated glyceride oils of the drying and semi-drying type such as linseed oil, soy bean oil, cottonseed oil, fish oils and the like. The open chain conjugated diolefins and conjugated triolefins employed in our process include those which have at least four and not more than ten carbon atoms per molecule, for example, butadiene, isoprene, piperylene, hexatriene and similar substances. We generally prefer to employ butadiene as the open chain conjugated olefinic material due to its being more readily available from abundant sources, notably the $C_4$ streams from petroleum refining. Our process may be carried out either in a batch or in a continuous manner.

TEST METHODS USED IN THE FOLLOWING EXAMPLES 100 grams of oil was dissolved in 60 grams of the bodied Varnish Makers & Painters Naphtha. To this was added cobalt and lead driers (naphthenates or linoleates) in the amount to provide 0.024 per cent cobalt and 0.048 per cent lead. The oil was then stirred thoroughly and spread on glass test plates in uniform layers and exposed to the atmosphere at room temperature. "Set dry" is the time required for the formation of a film which is sticky to the fingers but is not removed on contact. "Rub dry" is the time required at which the film is not broken upon rubbing, although still sticky. "Final dry" is the time required for the formation of a film which when pressed firmly with the fingers and then polished, leaves no prints. The standard method for determining iodine number was used.

EXAMPLE I

A steel bomb of 400 cc. capacity was charged with 145 grams of linseed oil and 94 grams butadiene and sealed. The temperature was raised to 250° F. and maintained between 250 and 300° F. for six hours. The bomb was then cooled and the unreacted butadiene vented to a condensing trap. A total of 55 grams of butadiene was recovered in this manner. Of that portion which was utilized 21 grams was combined with the linseed oil and 17 grams was converted to dimer.

After venting off the butadiene, the bomb was sealed and the temperature elevated to 550° F. and maintained between 530 and 600° F. for two hours. The oil was then removed and the dimer separated by fractionation. The product was tested for drying time and iodine number and the values so obtained compared with those obtained from bodied linseed oil. These values are shown in Table 1.

Table 1

|  | Butadiene-Linseed oil Product | Bodied Linseed Oil |
|---|---|---|
| Set Dry (Hours) | 1.7 | 3.0 |
| Rub Dry (Hours) | 2.5 | 6.0 |
| Final Dry (Hours) | 12.0 | 24.0 |
| Iodine Number | 153.1 | 116.5 |

EXAMPLE II

The experiment of Example I was repeated using 150 grams of soy bean oil and 52 grams of butadiene. The mixture was sealed in a bomb and heated for six hours at 200 to 350° F. Butadiene was vented and condensed to give a recovery of ten grams. The bomb was again sealed and the product heated at 500° F. for five hours. Dimer was then removed by fractionation and the condensate bodied at from 580 to 590° F. Upon weighing the final product showed a gain of 27 grams indicating the amount of butadiene condensed. The bodied oil had a Gardner-Holdt viscosity of Z-3, determined according to the method described on pages 495-500 in "Physical and Chemical Examination of Paints, Varnishes, Lacquers and Colors" by Henry A. Gardner, sixth edition, 1933, Institute of Paints and Varnish Research, Washington, D. C. Test data on this product as compared with untreated soy bean oil and bodied linseed oil are shown in Table 2.

Table 2

|  | Butadiene-Soy Bean Oil Product | Soy Bean Oil | Bodied Linseed Oil |
|---|---|---|---|
| Set Dry (Hours) | 1.75 | 48 | 3.0 |
| Rub Dry (Hours) | 4.0 |  | 6.0 |
| Final Dry (Hours) | 15.0 |  | 24.0 |
| Iodine Number | 123.0 | 85 | 116.5 |

EXAMPLE III

An experiment was carried out according to the method of Example I using 100 grams of soy bean oil and 102 grams of butadiene. The mixture was heated in a sealed bomb for 18.5 hours in the range 200 to 350° F. after which the unreacted butadiene was vented to a condenser, collected and weighed. The recovered butadiene weighed 16.7 grams. The reaction mixture was then heated in the range 350 to 500° F. for three hours. The total yield obtained was 171 grams of which 139 grams was soy bean oil-butadiene condensate and 32 grams was butadiene dimer. The product was bodied for 15 minutes at 580–590° F. to give a jelly-like product completely soluble in varnish makers and painters naphtha. Drying tests gave the results shown in Table 3.

Table 3

| Set dry (hours) | 1.25 |
|---|---|
| Rub dry (hours) | 3.00 |
| Final dry (hours) | 7.00 |
| Iodine number | 165.4 |

EXAMPLE IV

The experiment of Example I was repeated using 100 grams of fish oil (sardine) and 42 grams of butadiene. The mixture was heated in a sealed bomb for 9 hours at from 225 to 350° F. The bomb was then vented to remove 7.2 grams of butadiene remaining unreacted. The bomb was again sealed and held at temperatures between 350 and 500° F. for 1.5 hours. The product was removed and fractionated to remove butadiene dimer amounting to 19 grams. The final product, weighing 114 grams was bodied at 580 to 590° F. for 0.7 hour to provide a viscosity of Z-2 on the Gardner scale. Drying tests were carried out as previously described. The results of these tests together with those on untreated fish oil are shown in Table 4.

Table 4

|  | Butadiene-Fish Oil Product | Fish Oil |
|---|---|---|
| Set Dry (Hours) | 2.0 | 6.0 |
| Rub Dry (Hours) | 5.5 | 16.5 |
| Final Dry (Hours) | 40.0 |  |
| Iodine Number | 115.1 | 94.5 |

EXAMPLE V

The experiment of Example I was repeated using linseed oil and butadiene in the same ratio as before. The temperature was elevated to 500° F. immediately and held at this level for six hours. Upon cooling and opening the bomb only a very small amount of butadiene was obtained. Fractionation of the product showed that most of the butadiene which had not condensed with the oil was in the form of dimer.

EXAMPLE VI

The experiment of Example I was repeated using 150 grams of soy bean oil and 95 grams of isoprene. The mixture was sealed in the bomb and heated for five hours at 200 to 350° F. After venting the isoprene the bomb was again sealed and the product heated at about 500° F. for about six hours to stabilize the condensation product. The stabilized product was bodied by heating at 580 to 600° F. for thirty minutes. The bodied product had properties similar to those shown in Table 2.

It is to be understood that this invention should not be unnecessarily limited to the above discussion and description and that modifications and variations may be made without departing substantially from the invention or from the scope of the claims.

We claim:

1. A process for the condensation of an unsaturated glyceride oil with an aliphatic conjugated polyolefin to produce an improved drying oil, which comprises heating from 0.5 to 4.0 parts by weight of an unsaturated glyceride oil with one part by weight of such an aliphatic conjugated polyolefin having at least 4 and not more than 10 carbon atoms per molecule, under pressure sufficient to maintain a liquid phase, at a temperature within the limits of 200 to 350° F. and for a period of from 2 to 20 hours, whereby said polyolefin reacts with said unsaturated glyceride oil to form a condensate; removing unreacted aliphatic conjugated polyolefin and separately heating a resulting condensation product of said polyolefin and said oil at a temperature within the limits of from 350 to 600° F. for a period of from 1 to 10 hours, whereby the said condensation product is stabilized and bodied; and recovering stabilized condensation product as said improved drying oil.

2. A process for the condensation of linseed oil with 1,3-butadiene to produce an improved drying oil, which comprises heating from 0.5 to 4.0 parts by weight of linseed oil with one part by weight of 1,3-butadiene under pressure sufficient to maintain a liquid phase at a temperature within the limits of 200 and 350° F., for a period of 2 to 20 hours, whereby said butadiene and linseed oil react to form a condensate; recovering unreacted 1,3-butadiene and separately heating the resulting condensation product of linseed oil and butadiene at a temperature within the limits of from 350 to 600° F. for a period of from 1 to 10 hours, whereby the said condensation product is stabilized and bodied; and recovering stabilized condensation product as said improved drying oil.

3. A process for the condensation of linseed oil with isoprene which comprises heating from 0.5 to 4.0 parts by weight of linseed oil with one part by weight of isoprene under pressure sufficient to maintain a liquid phase, at a temperature within the limits of 200 to 350° F. and for a period of from 2 to 20 hours, whereby said linseed oil and isoprene react to form a condensate; recovering unreacted isoprene and separately heating the resulting condensation product of linseed oil and isoprene at a temperature within the limits of from 350 to 600° F. for a period of from 2 to 6 hours, whereby the said condensation product is stabilized and bodied; and recovering stabilized condensation product as an improved drying oil product of the process.

4. A process for the manufacture of an improved drying oil which comprises admixing linseed oil with 1,3-butadiene in a proportion of from 0.5 to 4.0 parts by weight of linseed oil per part by weight of butadiene, heating the resulting linseed oil-butadiene admixture under pressure sufficient to maintain a liquid phase, at a temperature within the limits of 200 to 350° F. and for a period of from 5 to 15 hours, whereby said butadiene and linseed oil react to form a condensate; said admixture heated as above described containing 1,3-butadiene, withdrawing butadiene from the last said admixture and heating resulting residual material at a temperature within the limits of 350 and 600° F.; and recovering the last said residual admixture thus heated as said improved drying oil.

5. A process for the manufacture of an improved drying oil which comprises admixing an unsaturated glyceride oil with an open chain aliphatic conjugated diolefin containing from 4 to 10 carbon atoms in the molecule in a proportion of from 0.5 to 4.0 parts by weight of said glyceride oil per part by weight of said diolefin, under pressure sufficient to maintain a liquid phase at a temperature within the limits of 200 to 350° F., for a period of from 2 to 20 hours, whereby said diolefin and said glyceride oil react to form a condensate; said admixture heated as above described containing 1,3-butadiene, withdrawing butadiene from the last said admixture and heating resulting residual material at a temperature within the limits of 350 to 600° F.; and recovering the last said residual mixture thus heated as said improved drying oil.

6. The process of claim 2 wherein said linseed oil is heated with said butadiene for a period of from 5 to 15 hours, and wherein said condensation product of linseed oil and butadiene is heated for a period within the limits of 2 to 6 hours.

7. The process of claim 5 wherein said unsaturated oil is soybean oil, and said conjugated diolefin is 1,3-butadiene.

8. The process of claim 5 wherein said unsaturated oil is cottonseed oil and wherein said conjugated diolefin is piperylene.

9. The process of claim 5 wherein said unsaturated glyceride oil is heated with said diolefin for a period of from 5 to 15 hours and wherein the condensation product of said glyceride oil and said diolefin is heated for a period of from 2 to 6 hours.

JOHN C. HILLYER.
JAMES T. EDMONDS.

REFERENCES CITED

The following references are of record in the file of this patent:

UNITED STATES PATENTS

| Number | Name | Date |
| --- | --- | --- |
| 737,249 | Kronstein | Aug. 25, 1903 |
| 1,151,002 | Ellis | Aug. 24, 1915 |
| 2,168,271 | Perquin | Aug. 1, 1939 |
| 2,280,802 | Depew | Apr. 28, 1942 |
| 2,401,769 | Mighton | June 11, 1946 |
| 2,443,044 | Lycan et al. | June 8, 1948 |